United States Patent [19]
Cantz

[11] 3,831,655
[45] Aug. 27, 1974

[54] ANTI SKID ELEMENT FOR A VEHICLE TIRE

[75] Inventor: Rudolf Cantz, Stuttgart, Germany

[73] Assignee: Kennametal Inc., Latrobe, Pa.

[22] Filed: Nov. 3, 1972

[21] Appl. No.: 303,316

[52] U.S. Cl. ............................................. 152/210
[51] Int. Cl. ................................................ B60c 27/00
[58] Field of Search ................................. 152/210

[56] References Cited
UNITED STATES PATENTS

| | | | |
|---|---|---|---|
| 1,017,732 | 2/1912 | Blaisdell | 152/210 |
| 2,301,569 | 11/1942 | Mucklich | 152/210 |
| 3,078,901 | 2/1963 | Iaquinta | 152/210 |
| 3,186,466 | 6/1965 | Keinanen | 152/210 |
| 3,230,998 | 1/1966 | Del Cegno | 152/210 |
| 3,473,591 | 10/1969 | Bingham | 152/210 |

FOREIGN PATENTS OR APPLICATIONS

| | | | |
|---|---|---|---|
| 755,407 | 3/1967 | Canada | 152/210 |
| 1,480,916 | 3/1969 | Germany | 152/210 |

*Primary Examiner*—Robert J. Spar
*Assistant Examiner*—Kenneth Noland
*Attorney, Agent, or Firm*—Melvin A. Crosby

[57] ABSTRACT

An anti-skid element for a vehicle tire in which the radially inner end of the element is cushioned in the tire tread in which it is mounted to control the force required to push the element radially inwardly into the tire.

2 Claims, 22 Drawing Figures

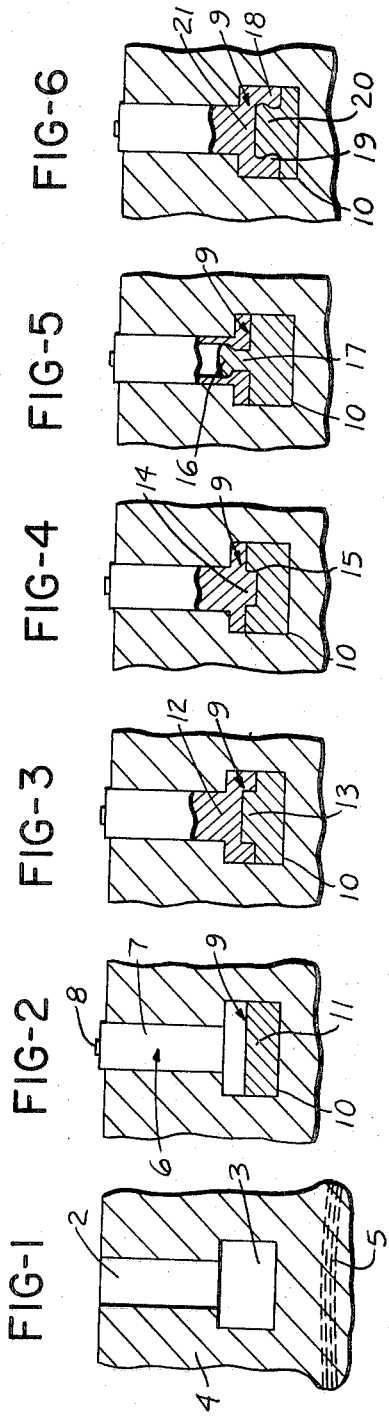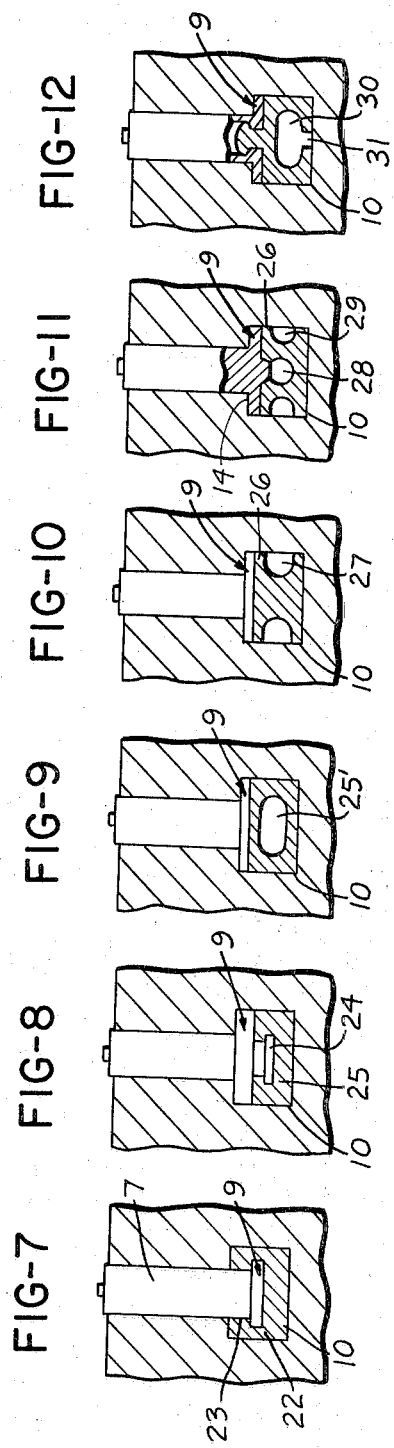

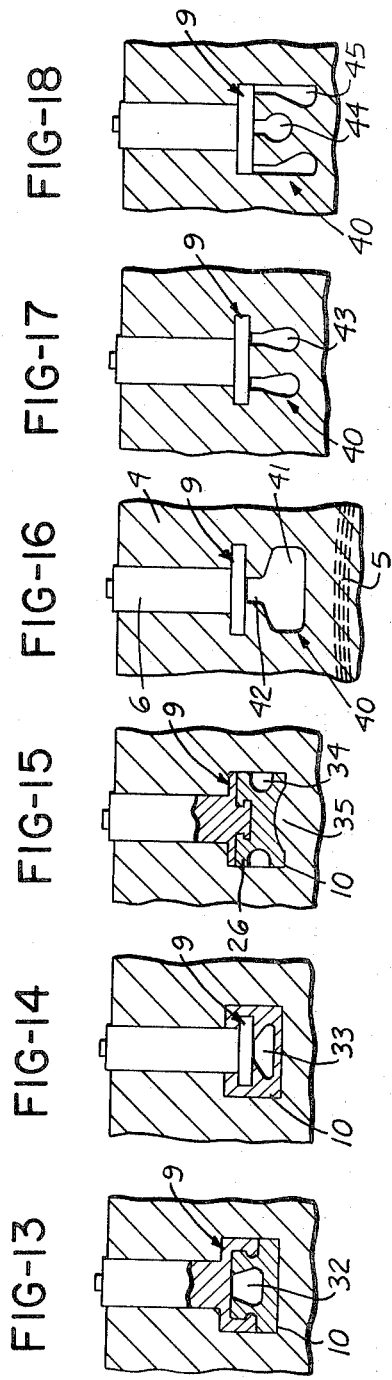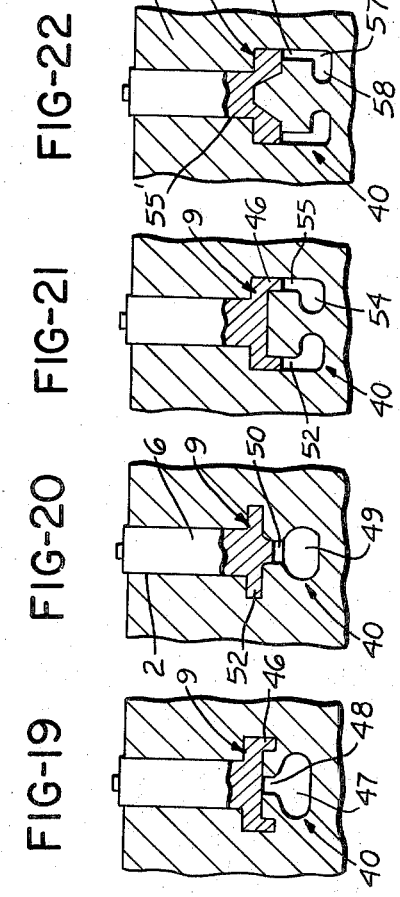

ANTI SKID ELEMENT FOR A VEHICLE TIRE

The present invention relates to anti-skid elements for vehicle tires, sometimes referred to as tire studs or spikes, and is particularly concerned with an arrangement for controlling the amount of force required to push the stud radially inwardly into the tire tread after it is mounted therein.

Anti-skid elements for vehicle tires, generally referred to as tire studs, consist of a body in the form of a cylindrical shank having a radial flange at one end forming the head for the stud and with a hard wear resistant pin mounted on the axis of the shank and projecting therefrom at the end of the shank opposite the head.

Such studs are mounted head end foremost into blind holes in the tread of a tire with the pin end of the shank about flush with the surface of the tire tread. By this arrangement, the hard wear resistant pin is caused to come into contact with a road surface on which the tire rolls and to engage the road surface in such a manner that it will penetrate hard snow and ice and therefore increase the grip of the tire in which it is mounted on the road surface.

The hard wear resistant pin generally consists of a carbide material, such as tungsten carbide or a mixture of hard metal carbides with a suitable binder material, such as cobalt or the like cementing the carbide together.

A problem that has been encountered in tire studs of the nature referred to is that it is difficult to match the wear rate of the hard wear resistant pin to the wear rate of the tread material of the tire, and after the tires are run for a period of time, the pin may protrude from the tread an excessive amount, and it will cause the pin to slip on the roadway and to cause the stud to tilt on the tire thereby producing road wear and enhancing the possibility that the stud will become loose in the tire and drop therefrom.

With the foregoing in mind, a primary object of the present invention is the provision of an arrangement for radially supporting a tire stud in a tire tread in such a manner that the tire stud will move radially into the tire tread when the outer end of the stud engages a road surface, but at a controlled force such that the pin of the tire stud effectively engages the road surface.

Another object of the present invention is the provision of a tire stud and a supporting arrangement therefor in a tire tread which will substantially reduce the amount of wear on the road occasioned by the studs running thereon.

Another object is the provision of a tire stud and a supporting arrangement therefor in a tire tread which will permit the pin of the tire stud adequately to penetrate snow and ice formations, but which will, at the same time, permit the stud to move almost in its entirety into the envelope of the tire tread when the tire in which the stud is mounted is running on a dry road.

Another object is the provision of a tire stud and a mounting arrangement therefor which is relatively inexpensive and which is easy to employ.

A still further object is the provision of the combination of a tire tread and a stud mounted therein in which the stud is resiliently supported in the tire tread so as to be effective on snow and ice while the stud moves relatively freely into the tread in the radial direction when the tire is running on a dry road.

BRIEF SUMMARY OF THE INVENTION

According to the present invention, a tire stud is provided in which the body has a cylindrical shank with a radial flange at one end forming the head of the stud and with a hard wear resistant pin mounted on the axis of the shank and protruding a short distance therefrom at the end of the stud opposite the head.

At this point, it should be noted that the present invention is not concerned with the specific manner of imparting wear resistance to the stud, and that the shank of the stud, at least in the region thereof opposite the head end thereof, could be caused to be wear resistant in some other manner, as by incorporating hard wear resistant material therein during the manufacture of the tire stud.

The tire stud is mounted head end foremost in a blind hole in the tread. The radially inner end of the stud extends to the bottom of the blind hole so that the stud is supported against radially inward movement into the tire tread. According to the present invention, a body of resilient material forms the radially inner end of the tire stud and engages the bottom of the blind hole in the tire tread in which the stud is mounted thereby to control the force which is required to push the stud radially inwardly into the tire tread.

This resilient material may take the form of a body of material of selected resiliency, such as rubber or the like, or it may take the form of a body having recesses therein to control the force required to compress the body. The body of resilient material can be mechanically separate from the remainder of the stud or the parts of the stud can be mechanically connected together, as by interfitting portions, or by cementing or bonding.

According to the present invention, it is also possible so to configure the end of the recess which is engaged by the head of the stud that the resiliency thereof is controlled. This is accomplished by forming recesses or pockets in the tire tread at the head end of the stud so that a space is provided into which the material of the tire tread can move when the stud is pressed radially inwardly into the tire tread.

These and other objects and advantages of the present invention will become more apparent upon reference to the following detailed specification taken in connection with the accompanying drawings in which:

FIG. 1 is a schematic sectional view through a tire tread showing the recess formed in the tire tread for receiving a tire stud.

FIGS. 2 to 4 are sectional views through a tire tread showing studs mounted therein with elastic material at the radially inner end of the tire stud at the bottom of the hole or recess in the tire tread in which the stud is mounted.

FIGS. 5 to 8 show views similar to FIGS. 2 to 4 but illustrating the resilient material mechanically connected to the remainder of the stud.

FIGS. 9 and 10 are sectional views showing an elastic material forming the radially inner end of the stud and having relieved regions therein for controlling the force at which the elastic material will compress.

FIGS. 11 to 15 are sectional views showing elastic members similar to that shown in FIGS. 9 and 10, namely, elastic members at the head end of the stud and mechanically connected to the remainder of the stud.

FIGS. 16 to 22 are sectional views showing different arrangements for configuring the inner end of the recess in which the stud is mounted in order to provide for the desired degree of elastic support for the stud.

DETAILED DESCRIPTION OF THE INVENTION

FIG. 1 shows a tire 1 having a radial recess 2 therein which may have an enlarged inner end 3. The recess is formed in the resilient tread material 4 of the tire which is vulcanized to the carcass 5 of the tire.

The anti-skid element in FIGS. 2 to 22, as indicated at 6, comprises a generally cylindrical shank 7 having a radial flange 9 at one end and having a hard wear resistant pin 8 mounted on the axis of shank 6 and protruding therefrom at the end thereof opposite flange 9. As will be seen in the drawings, the stud is mounted in the recess 2 provided therefor so that the radially outer end of the stud body is substantially flush with the surface of the tire tread. The stud is substantially the same in all of the views except for the configuration of the flange.

In FIGS. 2 to 8, a body 10 of resilient material forming a part of the stud is provided interposed between the flange 9 and the bottom of the recess in which the stud is mounted. Elastic body 10 is more resilient than the material of the tire tread and is advantageously formed of a foamed material which will compress more readily than the extremely dense material of the tire tread.

In FIG. 2, resilient body 10 may be secured to the flange 9 by cement or by vulcanization and has the same diameter as flange 9. The juncture of body 10 and flange 9, indicated at 11, may, in this case, be planar.

In FIG. 3, flange 9 has a central recess 12 and resilient body 10 has a protrusion 13 thereon which extends into recess 12. As before, body 10 is secured to the flange 9 as by cement or vulcanization.

In FIG. 4, an arrangement is shown which is substantially the reverse of that shown in FIG. 3 in that the flange 9 on the end of the stud has a protrusion 14 thereon while on the side of body 10 facing the flange 9 there is formed a recess 15 for receiving protrusion 14 with the body 10 being cemented or vulcanized to the flange. The arrangements of FIGS. 3 and 4 provide considerable lateral stability to the stud in that it inhibits lateral movement of the flange 9 of the stud in the recess.

FIGS. 5 to 8 show arrangements in which the body 10 of resilient material is mechanically connected to the flange 9 of the stud. In this case, the body 10 could be cemented or vulcanized to the flange 9, but also has a form fitting connection therewith.

In FIG. 5, the flange 9 of the stud has an undercut recess 16 therein while on the end of body 10 facing the flange 9 there is a somewhat mushroom shaped projection which can be inserted into the recess 16 thereby mechanically to hold body 10 on the flange 9.

In FIG. 6, flange 9 of the stud is formed with an axial flange 18 turned inwardly at 19 at the outer end and forming a recess adapted for receiving the projection 20 on body 10 which is shaped to fit into the space 21 delimited by the axial flange 18.

In FIG. 7, the flange 9 of the stud is somewhat smaller in diameter than those previously illustrated, and the body 10 has a recess therein, indicated at 20 with a radially inwardly projecting flange 23 at the outer end. The recess is adapted closely to embrace the flange 9.

In FIG. 8, the flange 9 of the stud has a projection 24 with a flange thereon and body 10 has a correspondingly shaped recess 25 for effecting mechanical connection of the resilient body 10 to the flange 9.

The several designs indicated in FIGS. 9 to 15 show how the resilient body 10 could be formed of a relatively high density material and the desired elastic characteristics imparted thereto through the use of hollow spaces and recesses and the like in the resilient material. The several manners of connecting the body 10 to the flange 9 of the stud in FIGS. 9 to 15 correspond to what has already been described in connection with FIGS. 2 to 8 and will not, therefore, be described in detail.

In FIG. 9, the body of resilient material 10 is formed with a central cavity 25' which provides space into which the resilient material can move when the stud is pressed radially inwardly into its recess.

In FIG. 10, resilient body 10 is provided with an annular recess 27 in the circumferential surface 26 of the body of material.

In FIG. 11, stud body 9 has a central protrusion thereon at 14 corresponding to protrusion 14 in FIG. 4, and this is received in the mouth of and closes a hollow space 28 provided in body 10. Resilient body 10 also has a radially outwardly opening annular recess 29 formed in the peripheral surface 26.

In FIG. 12, wherein the connection of the resilient body 10 to the flange 9 of the stud body corresponds to that shown in FIG. 5. The resilient body 10 in FIG. 12 has a central cavity 34 which opens in a direction away from the stud by way of a central opening 31.

FIG. 13 shows an arrangement similar to that of FIG. 6 except that resilient body 10 has a central cavity 32 therein which opens toward the stud head.

FIG. 14 shows an arrangement similar to FIG. 7 except that the resilient body 10 has a central cavity 33 which opens toward the flange 9.

FIG. 15 is similar to FIG. 8 except that the resilient body 10 has a radially outwardly opening annular recess formed in the periphery 26 thereof and a rather shallow cavity 35 opening away from the stud body.

The arrangements of FIGS. 16 to 22 show how the benefits of the present invention can be attained without the use of a body of resilient material by configuring the region of the tread material adjacent the stud head so that the configured region of the tread material will exhibit the desired degree of resiliency to oppose radially inward movement of the stud into the tire tread. The configured region of the tire tread is generally indicated at 40 in FIGS. 16 to 22.

In FIG. 16, the tire tread radially inwardly from the head end of the recess in which the tire stud is mounted is provided with a cavity 41 nearly as large as the stud head and having a reduced diameter opening 42 at the end of the cavity.

In FIG. 17, the region 40 of the tire tread is formed with an annular recess 43 therein which advantageously is larger in cross sectional area in a region remote from the stud head than it is immediately adjacent the stud head.

In FIG. 18, the region 40 of the tire tread has a cylindrical cavity 44 and an annular cavity 45 therein, each preferably being of substantially cross sectional area immediately adjacent the flange 9 of the stud and which now forms the head end thereof. In the modifications of FIGS. 16 to 18, the flange 9 facing the bottom of the recess in which it is mounted may be planar, thereby simplifying the construction of the stud body.

In FIG. 19, flange 9 has an axial flange 46 projecting therefrom toward the bottom of the recess in which the stud is mounted and the recess is advantageously formed with an annular axial cavity to receive flange 46. Also, the region 40 of the tire tread radially inwardly from head 9 of the stud is formed with a cavity 47 communicating by way of a reduced diameter opening 48 with the head of the stud.

In FIG. 20, the region 40 of the tread is provided with a cavity 49 having a neck 50 at the head end into which the protrusion 52 on the flange 9 of the stud extends.

In FIG. 21, the flange 9 has a flange 46 the same as that shown at 46 in FIG. 19, and the region 40 of the tire tread is formed with an annular recess 52 which is enlarged at the axially inner end as at 54 and which has an annular neck region 55 into which the flange 46 of the stud head projects.

Finally, in FIG. 22, the flange 9 of the stud is formed with a conical recess 55' which receives a correspondingly shaped protrusion in the tire tread which is surrounded by an annular cavity 57 enlarged at the radially inner end at 58 and having a neck portion 56 of reduced cross section leading radially outwardly to the head of the stud.

In the modifications of FIGS. 2 to 15, the desired resistance to inward movement of the stud into the tire tread is provided by the mounting of a body of material of controlled compressibility or resilience on the flange end of the stud which bears on the radially inner end of the recess in which the stud is mounted.

In the modifications of FIGS. 16 to 22, the tire tread material itself is configured to provide the proper degree of resistance to radially inward movement of the tire stud into the tread.

The recesses in which the studs are mounted can all be provided at the time the tire is manufactured by providing mold pins in the tire mold which define the desired configuration in the tire tread. Such pins will pull out of the tread when the tread is cured.

In general, the cylindrical portion of the recess in which the stud is to be mounted will be smaller in diameter than the shank of the stud, and when the stud is mounted in the tire, the recess is radially expanded by a suitable tool, and the stud is pushed into the recess. When the tool is removed, the tread material collapses the stud tightly in the radial direction and supports it in the tire tread.

In the case of at least the modifications of FIGS. 2 to 15, the forming of the enlarged region 3 at the radially inner end of recess 2 is not essential, and the recess may, instead, consist of a straight blind hole formed in the tire tread.

Modifications may be made within the scope of the appended claims.

What is claimed is:

1. In a tire stud; a member comprising a shank having radial flange means at one end and a body of resilient material on the side of said flange means which faces away from said shank, said body and said flange means have interfitting portions to keep them together, said shank having a hard wear resistant element therein mounted on the axis of the shank at the end opposite the said one end of the shank.

2. A tire stud according to claim 1 in which said interfitting portions include means projecting axially from one of said flange means and body and a recess in the other thereof receiving said axially projecting means.

* * * * *